United States Patent
van de Wetering et al.

(10) Patent No.: US 10,273,358 B2
(45) Date of Patent: Apr. 30, 2019

(54) POLYCARBONATE COMPOSITION

(71) Applicant: SABIC Global Technologies B.V., Bergen op Zoom (NL)

(72) Inventors: Karin Irene van de Wetering, Noord-Brabant (NL); Robert van de Grampel, Bergen op Zoom (NL)

(73) Assignee: SABIC GLOBAL TECHNOLOGIS B.V., Bergen OP Zoom (NL)

( * ) Notice: Subject to any disclaimer, the term of this patent is extended or adjusted under 35 U.S.C. 154(b) by 254 days.

(21) Appl. No.: 15/305,581

(22) PCT Filed: Apr. 22, 2015

(86) PCT No.: PCT/IB2015/052923
§ 371 (c)(1),
(2) Date: Oct. 20, 2016

(87) PCT Pub. No.: WO2015/166381
PCT Pub. Date: Nov. 5, 2015

(65) Prior Publication Data
US 2017/0044365 A1    Feb. 16, 2017

Related U.S. Application Data

(60) Provisional application No. 61/986,154, filed on Apr. 30, 2014.

(51) Int. Cl.
*C08L 69/00* (2006.01)
*C08K 3/22* (2006.01)
*C08K 5/523* (2006.01)
*C08L 83/10* (2006.01)

(52) U.S. Cl.
CPC .............. *C08L 69/00* (2013.01); *C08K 3/22* (2013.01); *C08K 5/523* (2013.01); *C08L 69/005* (2013.01); *C08L 83/10* (2013.01); *C08L 2201/02* (2013.01); *C08L 2205/02* (2013.01); *C08L 2205/025* (2013.01); *C08L 2205/03* (2013.01)

(58) Field of Classification Search
CPC .. C08L 69/00; C08L 2201/02; C08L 2205/02; C08L 2205/025; C08L 2205/03
See application file for complete search history.

(56) References Cited

U.S. PATENT DOCUMENTS

| | | | |
|---|---|---|---|
| 7,498,383 B2 | 3/2009 | Chen et al. | |
| 7,498,401 B2 | 3/2009 | Agarwal | |
| 7,695,815 B2 | 4/2010 | Agarwal et al. | |
| 7,790,292 B2 | 9/2010 | Colborn et al. | |
| 7,858,700 B2 | 12/2010 | Bhat et al. | |
| 7,935,777 B2 | 5/2011 | De Kraker et al. | |
| 8,022,166 B2 | 9/2011 | De Kraker et al. | |
| 8,399,546 B2 | 3/2013 | Li et al. | |
| 8,674,008 B2 | 3/2014 | Van De Wetering et al. | |
| 8,703,855 B2 | 4/2014 | Van De Wetering et al. | |
| 8,703,856 B2 | 4/2014 | Van De Wetering et al. | |
| 2006/0205848 A1 | 9/2006 | Siripurapu et al. | |
| 2007/0082989 A1 | 4/2007 | Glasgow et al. | |
| 2007/0149651 A1 | 6/2007 | Teshima et al. | |
| 2008/0081860 A1* | 4/2008 | Li | C08G 64/14 524/414 |
| 2009/0298992 A1 | 12/2009 | De Sarkar et al. | |
| 2009/0318604 A1* | 12/2009 | de Kraker | C08L 69/00 524/451 |
| 2010/0152344 A1 | 6/2010 | Van Den Bogerd et al. | |
| 2011/0229704 A1 | 9/2011 | Grcev et al. | |
| 2012/0248102 A1 | 10/2012 | Van De Wetering et al. | |
| 2012/0252985 A1 | 10/2012 | Rosenquist et al. | |
| 2013/0137801 A1 | 5/2013 | Ha et al. | |
| 2013/0274417 A1 | 10/2013 | Muthulakshmi et al. | |
| 2013/0313493 A1 | 11/2013 | Wen et al. | |
| 2017/0037245 A1 | 2/2017 | Van De Wetering | |

FOREIGN PATENT DOCUMENTS

| | | |
|---|---|---|
| EP | 2079788 B1 | 11/2010 |
| EP | 1582549 B1 | 9/2011 |
| EP | 2112203 B1 | 9/2011 |
| JP | 2010196009 A | 9/2010 |
| WO | 2008016764 A2 | 2/2008 |
| WO | 2011097185 A1 | 8/2011 |
| WO | 2013100606 A1 | 7/2013 |
| WO | 2017203480 A1 | 11/2017 |

OTHER PUBLICATIONS

International Search Report for International Application No. PCT/IB2015/052923, International Filing Date Apr. 22, 2015, dated Aug. 18, 2015, 4 pages.
Written Opinion for International Application No. PCT/IB2015/052923, International Filing Date Apr. 22, 2015, dated Aug. 18, 2015, 5 pages.

* cited by examiner

Primary Examiner — Wenwen Cai
(74) Attorney, Agent, or Firm — Cantor Colburn LLP

(57) ABSTRACT

Polycarbonate blends with a combination of high thin wall flame retardance, CTI Class 2 tracking resistance, and good dimensional stability are disclosed. The blends are a combination of a polycarbonate polymer, a polycarbonate-polysiloxane copolymer, a copolymer of bisphenol-A and a phthalimidine, titanium dioxide, and a phosphorus-containing flame retardant. The polycarbonate blends may be used in various applications.

19 Claims, No Drawings

POLYCARBONATE COMPOSITION

CROSS-REFERENCE TO RELATED APPLICATIONS

This application is a 371 of PCT Patent Application Serial No. PCT/IB2015/052923, filed Apr. 22, 2015, which claims priority to U.S. Provisional Patent Application Ser. No. 61/986,154, filed Apr. 30, 2014. The disclosures of which applications are hereby fully incorporated by reference herein.

BACKGROUND

The present disclosure relates to polycarbonate compositions that have a combination of low temperature impact resistance, thin wall flame retardance (FR), good electrical tracking resistance, and reduced halogen content. These polycarbonate compositions can be useful for various applications.

Polycarbonates (PC) are synthetic engineering thermoplastic resins, and are a useful class of polymers having many beneficial properties. Polycarbonate resins are used for a number of different commercial applications, including electronic engineering (E&E) parts, mechanical parts and so on. Because of their broad use, it is desirable to provide polycarbonates having good flame retardance. The market is also moving towards articles having thin walls for purposes of slimness, weight reduction, and size reduction of the overall final product, as well as more complex designs.

Desirably, polycarbonate compositions should also have good flow properties. Good flow properties reflect how easily the polymeric composition can be poured into a mold for forming the shape of the part. Better impact properties are also desirable. A conventional way of increasing stiffness is by increasing the weight average molecular weight of the polymer, but this typically also reduces the flow properties and makes it difficult to fill complex or thin-walled molds. Common flame retardant additives do not provide this balance between properties.

There remains a need in the art for flame retardant polycarbonate compositions that have good thin wall flame retardance, provide good electrical tracking resistance, and maintain ductility at low temperatures while providing the desired color. This need is especially apparent when high levels of $TiO_2$ are needed.

BRIEF DESCRIPTION

Disclosed herein are polycarbonate blends which have a combination of thin wall FR ratings and high flow combined with retention in mechanical properties as shown by low temperature impact resistance. The blends include varying amounts of a polycarbonate polymer, a polycarbonate-polysiloxane copolymer, a copolymer of bisphenol-A and phthalimidine, titanium dioxide, and a non-brominated and non-chlorinated phosphorus-containing flame retardant.

Disclosed in various embodiments herein are flame-retardant polycarbonate blends, comprising: a polycarbonate polymer; a polycarbonate-polysiloxane copolymer in an amount such that the blend contains from about 2 wt % to about 6 wt % of siloxane; a copolymer of bisphenol-A and phthalimidine in an amount such that the blend contains from about 1 wt % to about 10 wt % of the phthalimidine; titanium dioxide ($TiO_2$); and a non-brominated and non-chlorinated phosphorus-containing flame retardant; wherein the polycarbonate blend meets CTI PLC 2 standards and has a flame out time (FOT) of about 40 seconds or less at 1.5 mm thickness.

The polycarbonate blend may pass the ball pressure test (BPT) at 125° C.

The polycarbonate blend may have a pFTP(V1) value of at least 0.90 at 0.8 mm thickness, and/or may have a pFTP(V0) value of at least 0.80 at 1.5 millimeters (mm) thickness.

The blend may have any combination of the following properties: 100% ductility at −30° C. when measured under Izod notched impact according to ISO 180; a notched Izod impact strength at −30° C. of at least 25 $kJ/m^2$ when measured according to ISO 180; a pFTP(V0) of at least 0.90 and a flame out time (5-bar FOT) of about 30 seconds or less at 0.8 mm thickness; and a flame out time (5-bar FOT) of about 40 seconds or less and a pFTP(V0) value of at least 0.80 at 1.5 mm thickness.

In particular embodiments, the blend passes the ball pressure test (BPT) at 125° C., and has 100% ductility at −30° C. when measured under Izod notched impact according to ISO 180.

In other embodiments, the blend has a flame out time (FOT) of about 40 seconds or less and a pFTP(V0) value of at least 0.80 at 0.8 mm thickness; passes the ball pressure test (BPT) at 125° C.; and has 100% ductility at −30° C. when measured under Izod notched impact according to ISO 180.

In still other embodiments, the blend passes the ball pressure test (BPT) at 125° C.; has 100% ductility at −30° C. when measured according to ISO 180; and has a notched Izod impact strength at −30° C. of at least 25 kiloJoule per square meter ($kJ/m^2$) when measured according to ISO 180.

Sometimes, the blend has a flame out time (FOT) of about 30 seconds or less and a pFTP(V0) value of at least 0.90 at 0.8 mm thickness; and has a notched Izod impact strength at −30° C. of at least 20 $kJ/m^2$ when measured according to ISO 180.

The polycarbonate polymer may comprise a high molecular weight polycarbonate polymer having a Mw above 25,000 and a low molecular weight polycarbonate polymer having a Mw below 25,000.

The polycarbonate-polysiloxane copolymer may contain from about 6 wt % to about 20 wt % of siloxane. The phthalimidine may be 2-phenyl-3,3-bis(4-hydroxyphenyl) phthalimidine. The copolymer of bisphenol-A and phthalimidine may contain from about 20 mole % to about 40 mole % of the phthalimidine. The titanium dioxide may have a silicon-based coating. The flame retardant may be bisphenol-A bis(diphenylphosphate).

In specific embodiments, the blend contains the non-brominated and non-chlorinated phosphorus-containing flame retardant in an amount such that the blend contains from about 0.15 wt % to about 1.0 wt % of phosphorus. In others, the blend contains from about 2 wt % to about 10 wt % of the non-brominated and non-chlorinated phosphorus-containing flame retardant.

In particular variations herein, the polycarbonate blend contains: from about 30 wt % to about 80 wt % of the polycarbonate polymer; from about 2 wt % to about 20 wt % of the $TiO_2$; and from about 2 wt % to about 10 wt % of the non-brominated and non-chlorinated phosphorus-containing flame retardant.

The polycarbonate blend may contain from about 0.1 wt % to about 1 wt % of carbon black. The polycarbonate blend may further comprise from about 0.05 wt % to about 1 wt % of an anti-drip agent.

In various embodiments, the polycarbonate blend can achieve UL94 V0 performance at a thickness of 1.5 mm, or can achieve UL94 V1 performance at a thickness of 0.8 mm.

The polycarbonate blend can be prepared so that the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected to obtain a designed combination of (i) an notched Izod impact strength in kJ/m$^2$ (INI) with (ii) either a ball pressure test indentation in millimeters (BPT) or a Vicat B120 temperature in ° C. (Vicat), according to three equations described further herein.

Also disclosed in variations herein are methods for preparing a blend having a desired combination of a ball pressure test indentation in millimeters (BPT), a Vicat B120 temperature in ° C. (Vicat), and an notched Izod impact strength in kJ/m$^2$ (INI), comprising: blending a polycarbonate polymer, a polycarbonate-polysiloxane copolymer, a copolymer of bisphenol-A and phthalimidine, TiO$_2$, and a non-brominated and non-chlorinated phosphorus-containing flame retardant to obtain the blend; wherein the blend contains from about 2 wt % to about 6 wt % of siloxane, and from about 1 wt % to about 10 wt % of the phthalimidine; wherein the polycarbonate blend meets CTI PLC 2 standards and has a flame out time (FOT) of about 40 seconds or less at 1.5 mm thickness; and wherein the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected according to three equations described further herein to obtain the desired combination of (i) an notched Izod impact strength in kJ/m$^2$ (INI) with (ii) either the ball pressure test indentation in millimeters (BPT) or a Vicat B120 temperature in ° C. (Vicat).

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

It should be noted that weight percentage or "wt %", is based on the total weight of the polymeric composition.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Examples of aliphatic groups include methyl, ethyl, isopropyl, isobutyl, and methoxy.

The term "alkyl" refers to a linear or branched array of atoms that is composed of only carbon and hydrogen. The array of atoms may include single bonds, double bonds, or triple bonds (i.e. alkane, alkene, or alkyne). Alkyl groups may be substituted (i.e. one or more hydrogen atoms is replaced) or unsubstituted. Examples of alkyl groups include methyl, ethyl, and isopropyl. Alkyl is a subset of aliphatic.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. Aromatic groups are not substituted. Examples of aromatic groups include phenyl, pyridyl, thienyl, naphthyl and biphenyl.

The term "aryl" refers to an aromatic radical composed entirely of carbon atoms and hydrogen atoms. When aryl is described with a numerical range of carbon atoms, it does not include substituted aromatic radicals. For example, "aryl containing from 6 to 10 carbon atoms" refers to a phenyl group (C6) and a naphthyl group (C10), but not a methylphenyl group (7 carbon atoms). Aryl is a subset of aromatic.

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group ($C_6H_{11}CH_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Examples of cycloaliphatic groups include cyclopropyl, cyclobutyl, piperidinyl, and 2,2,6,6-tetramethylpiperydinyl.

As used herein, unless specifically stated otherwise, the test standards are the most recent standard available as of the date of Apr. 15, 2014.

The term "cycloalkyl" refers to an array of atoms which is cyclic but is not aromatic, and which is composed exclusively of carbon and hydrogen. Cycloalkyl groups may be substituted or unsubstituted. Cycloalkyl is a subset of cycloaliphatic.

In the definitions above, the term "substituted" refers to at least one hydrogen atom on the named radical being substituted with another functional group, such as alkyl, halogen, —OH, —CN, —NO$_2$, —COOH, etc.

The term "perfluoroalkyl" refers to a linear or branched array of atoms that is composed exclusively of carbon and fluorine.

The term "room temperature" refers to a temperature of 23° C.

The polycarbonate blends of the present disclosure include (A) at least one polycarbonate polymer; (B) a polycarbonate-polysiloxane copolymer; (C) a copolymer of bisphenol-A and phthalimidine; (D) titanium dioxide; and (E) a non-brominated and non-chlorinated phosphorus-containing flame retardant. In additional embodiments, the blends may contain (F) carbon black; and/or (G) an anti-drip agent.

As used herein, the terms "polycarbonate" and "polycarbonate polymer" mean a polymer having repeating structural carbonate units of the formula (1):

in which at least about 60 percent of the total number of R$^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each R$^1$ is an aromatic organic radical, for example a radical of the formula (2):

$$-A^1-Y^1-A^2-  \quad (2)$$

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, wherein R$^1$ is as defined above. Dihydroxy compounds suitable in an interfacial reaction include the dihydroxy compounds of formula (A) as well as dihydroxy compounds of formula (3)

$$HO-A^1-Y^1-A^2-OH \quad (3)$$

wherein Y$^1$, A$^1$ and A$^2$ are as described above. Also included are bisphenol compounds of general formula (4):

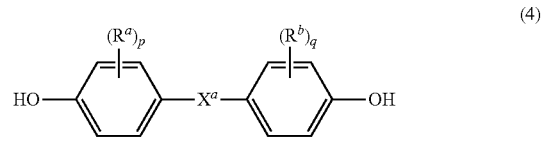

wherein R$^a$ and R$^b$ each represent a halogen atom or a monovalent hydrocarbon group and may be the same or different; p and q are each independently integers of 0 to 4; and X$^a$ represents one of the groups of formula (5):

wherein R$^c$ and R$^d$ each independently represent a hydrogen atom or a monovalent linear or cyclic hydrocarbon group and R$^e$ is a divalent hydrocarbon group.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 2-phenyl-3,3-bis(4-hydroxyphenyl) phthalimidine ("PPPBP"). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

"Polycarbonate" and "polycarbonate polymer" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6):

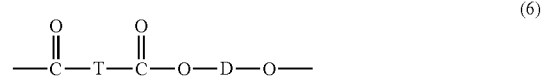

wherein D is a divalent radical derived from a dihydroxy compound, and may be, for example, a C$_{2-10}$ alkylene radical, a C$_{6-20}$ alicyclic radical, a C$_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. In other embodiments, dicarboxylic acids that contain a C4-C36 alkylene radical may be used to form copolymers of formula (6). Examples of such alkylene radicals include adipic acid, sebacic acid, or dodecanoic acid.

In one embodiment, D is a $C_{2-6}$ alkylene radical. In another embodiment, D is derived from an aromatic dihydroxy compound of formula (7):

(7)

wherein each $R^k$ is independently a $C_{1-10}$ hydrocarbon group, and n is 0 to 4. The halogen is usually bromine. Examples of compounds that may be represented by the formula (7) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof.

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexanedimethanol-1,4-cyclohexanedicarboxylate) (PCCD), having recurring units of formula (8):

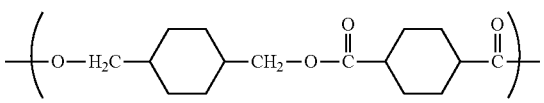

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

In specific embodiments of the present disclosure, the polycarbonate polymer (A) is derived from a dihydroxy compound having the structure of Formula (I):

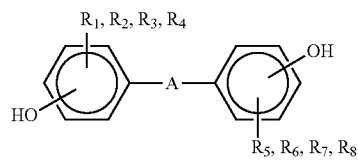

Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl) propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl) propane; 1,1-bis(4-hydroxyphenyl) cyclohexane; 4,4'dihydroxy-1,1-biphenyl; 4,4'-dihydroxy-3, 3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

In more specific embodiments, the polycarbonate polymer (A) is a bisphenol-A homopolymer. The polycarbonate polymer may have a weight average molecular weight (Mw) of from about 15,000 to about 70,000 daltons, according to polycarbonate standards, including a range of from about 20,000 to about 40,000 daltons, or an Mw above 30,000. The polycarbonate polymer can be a linear or branched polycarbonate, and in more specific embodiments is a linear polycarbonate.

In some embodiments of the present disclosure, the polycarbonate composition includes two polycarbonate polymers, i.e. a first polycarbonate polymer (A1) and a second polycarbonate polymer (A2). The two polycarbonate polymers may have the same or different monomers.

The first polycarbonate polymer has a greater weight average molecular weight than the first polycarbonate polymer. The first polycarbonate polymer may have a weight average molecular weight of above 25,000 (measured by GPC based on BPA polycarbonate standards). The second polycarbonate polymer may have a weight average molecular weight of below 25,000 (measured by GPC based on BPA polycarbonate standards). In embodiments, the weight ratio of the first polycarbonate polymer to the second polycarbonate polymer is usually at least 0.5:1, and in further embodiments is at least 1:1. Note the weight ratio described here is the ratio of the amounts of the two copolymers in the blend, not the ratio of the molecular weights of the two copolymers. The weight ratio between the two polycarbonate polymers can affect the flow properties, ductility, and surface aesthetics of the final blend. The blends may include from about 30 to about 80 wt % of the polycarbonate polymer.

Suitable polycarbonates can be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate compositions of the present disclosure also contain a polycarbonate-polysiloxane copolymer (B). This copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

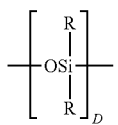

(9)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. Generally, D may have an average value of 2 to about 1000, specifically about 2 to about 500, more specifically about 5 to about 200, and more specifically about 10 to about 75. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

In one embodiment, the polydiorganosiloxane blocks are provided by repeating structural units of formula (10):

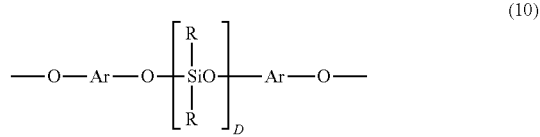

(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used.

Such units may be derived from the corresponding dihydroxy compound of the following formula (11):

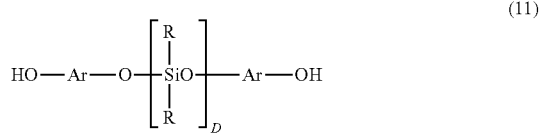

(11)

wherein Ar and D are as described above. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

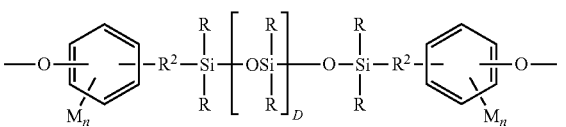

(12)

wherein R and D are as defined above. $R^2$ in formula (12) is a divalent $C_2$-$C_8$ aliphatic group. Each M in formula (12) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

(13)

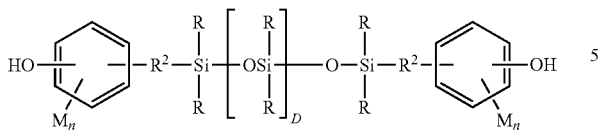

wherein R, D, M, R², and n are as described above.

Such dihydroxy polysiloxanes can be made by effecting a platinum catalyzed addition between a siloxane hydride of the formula (14), (14)

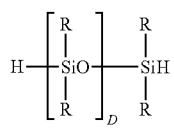

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

The siloxane blocks may make up from greater than zero to about 25 wt % of the polycarbonate-polysiloxane copolymer, including from 4 wt % to about 25 wt %, from about 4 wt % to about 10 wt %, or from about 15 wt % to about 25 wt %. The polycarbonate blocks may make up from about 75 wt % to less than 100 wt % of the block copolymer, including from about 75 wt % to about 85 wt %. It is specifically contemplated that the polycarbonate-polysiloxane copolymer is a diblock copolymer. The polycarbonate-polysiloxane copolymer may have a weight average molecular weight of from about 28,000 to about 32,000. Generally, the amount of the polycarbonate-polysiloxane copolymer is sufficient for the overall polycarbonate blend to contain from about 2 wt % to about 6 wt % of siloxane. For example, if the polycarbonate-polysiloxane copolymer contains 20 wt % of siloxane, the blend may contain from about 14 to about 24 wt % of the polycarbonate-polysiloxane copolymer.

The polycarbonate blends of the present disclosure also include a copolymer (C) of bisphenol-A and a phthalimidine. The phthalimidine monomer may have the structure of formula (15):

(15)

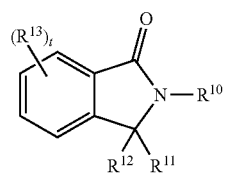

wherein $R^{10}$, $R^{11}$, $R^{12}$, and $R^{13}$ are independently selected from hydrogen, alkyl, substituted alkyl, aryl, and substituted aryl. In particular embodiments, the phthalimidine monomer is 2-phenyl-3,3-bis(4-hydroxyphenyl) phthalimidine, which is illustrated below as formula (15-a):

(15-a)

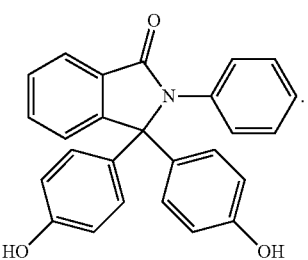

The phthalimidine blocks may make up from greater than zero to about 67 mole % of the polycarbonate-polysiloxane copolymer, including from about 20 mole % to about 40 mole %. The polycarbonate blocks may make up from about 33 mole % to less than 100 mole % of the block copolymer, including from about 60 mole % to about 80 mole %. It is specifically contemplated that the bisphenol-phthalimidine copolymer is a diblock copolymer. The bisphenol-phthalimidine copolymer may have a weight average molecular weight of from about 15,000 to about 30,000. Generally, the amount of the bisphenol-phthalimidine copolymer is sufficient for the overall polycarbonate blend to contain from about 1 mole % to about 10 mole % of the phthalimidine. For example, if the bisphenol-phthalimidine copolymer contains 33 mole % of phthalimidine, the blend may contain from about 3 wt % to about 30 wt % of the bisphenol-phthalimidine copolymer.

The polycarbonate blends of the present disclosure also comprise titanium dioxide (D). The titanium dioxide has an average particle size of from about 30 nm to about 500 nm, including from about 100 nm to about 500 nm, or from about 150 nm to about 500 nm, or from about 100 nm to about 250 nm, or from about 150 nm to about 200 nm, or from about 30 nm to about 180 nm. In some embodiments, the titanium dioxide particles may be coated, for example with a silicon-based coating. The titanium dioxide may be present in the blends of the present disclosure in amounts of up to about 20 wt %, including from about 2 wt % to about 20 wt %, from about 2 wt % to about 5 wt %, from about 3 wt % to about 10 wt %, and from about 4 wt % to about 7 wt %.

The polycarbonate blends of the present disclosure also include a phosphorus-containing flame retardant additive (E). This flame retardant does not contain bromine or chlorine. The flame retardant additive (E) is present in the blend in an amount such that the blend contains from about 0.15 wt % to about 1.0 wt % of phosphorus. Depending on the additive that is used, the additive may comprise from about 2 wt % to about 10 wt % of the blend, including from about 2.5 wt % to about 10 wt %, or from about 3 wt % to about 7 wt %. More than one flame retardant additive may be present, i.e. combinations of such additives are contemplated. In this regard, it was unexpectedly discovered that common flame retardants such as potassium perfluorobutane sulfonate ("Rimar salt") and potassium diphenylsulfon-3-sulfonate ("KSS") negatively affect the CTI rating of the resulting blend.

The phosphorus-containing flame retardant compound can be an organic phosphate or an organic compound containing phosphorus-nitrogen bonds. One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas (II-a), (II-b), and (II-c) below:

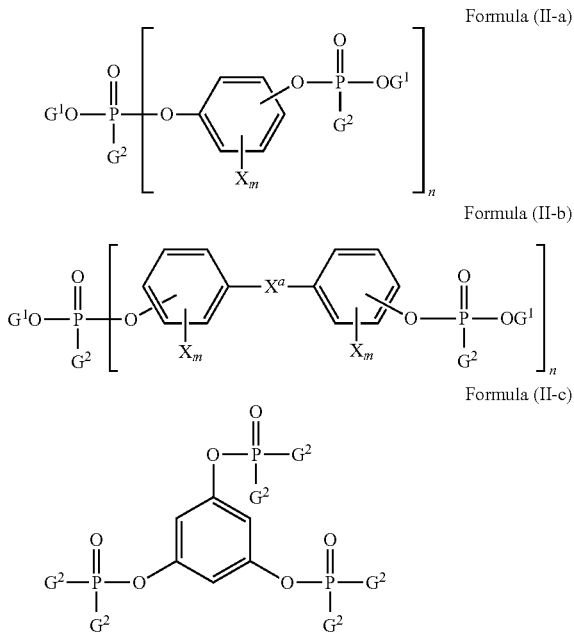

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis (diphenyl)phosphate of hydroquinone and the bis(diphenyl) phosphate of bisphenol-A, and the like. In particular embodiments, the phosphorous-containing flame retardant is bisphenol-A bis(diphenylphosphate), which can be abbreviated as BPADP.

In particular embodiments, the blend also comprises carbon black (F). Generally, any suitable carbon black may be used. The carbon black can be present in an amount of from about 0.1 wt % to about 1 wt % of the blend.

In particular embodiments, the blend also comprises an anti-drip agent (G). Anti-drip agents include, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. The anti-drip agent can be present in an amount of from about 0.05 wt % to about 1 wt % of the blend.

In embodiments, the polycarbonate blends of the present disclosure comprise from about 30 wt % to about 80 wt % of the polycarbonate polymer (A); from about 14 wt % to about 24 wt % of the polycarbonate-polysiloxane copolymer (B); from about 3 wt % to about 30 wt % of the bisphenol-phthalimidine copolymer (C); from about 2 wt % to about 20 wt % of the titanium dioxide (D); and from about 2 wt % to about 10 wt % of the phosphazene flame retardant (C). It should be noted that the at least one polycarbonate polymer (A) may be a blend of two or more polycarbonate polymers having different weight average molecular weights, and the recited about 30 wt % to about 80 wt % refers to the total amount of such polycarbonate polymers (A) in the blend. When present, the blends can comprise from about 0.1 wt % to about 1 wt % of the carbon black (F); and from about 0.05 wt % to about 1 wt % of the antidrip agent (F).

In more specific embodiments, the polycarbonate blend may comprise from about 40 wt % to about 60 wt % of the polycarbonate polymer (A). In more specific embodiments, the polycarbonate blend may comprise from about 2 wt % to about 5 wt % of the titanium dioxide (D). In more specific embodiments, the polycarbonate blend may comprise from about 3 wt % to about 7 wt % of the flame retardant additive (E). The polycarbonate blends of the present disclosure may have any combination of these amounts for these ingredients.

The polycarbonate blends of the present disclosure have a combination of low temperature impact resistance, flame retardance at thin wall thicknesses, good tracking resistance, and good impact strength.

The polycarbonate blends of the present disclosure may have 100% ductility at −30° C., when measured under Izod notched impact according to ISO 180. This serves as a proxy for determining whether the material will shatter rather than bending or deforming. It is noted that the ductility is measured using the Izod notched impact test according to ISO 180, and the ductility is specifically not measured using the multiaxial impact (MAI) test of ISO 6603. These two tests will result in different measurements for the same composition.

The polycarbonate blends of the present disclosure may achieve V0 or V1 performance at a thickness of 1.5 millimeters (mm), when measured according to UL94. They can also achieve V0 or V1 performance at a thickness of 0.8 mm. More specifically, the polycarbonate blends have a specified pFTP and flame out time (FOT). These are discussed in the Examples herein. As noted there, it is assumed that a material that achieves a stated performance at a given thickness can also achieve the same performance at higher thicknesses (e.g. a material that obtains V0 performance at 0.8 mm thickness can also obtain V0 performance at 1.0 mm thickness, 1.5 mm, etc.).

The polycarbonate blends may have a pFTP(V0) value of at least 0.80 or at least 0.90, when measured at a thickness of 1.5 mm. The polycarbonate blends may have a pFTP(V1) value of at least 0.80 or at least 0.90, when measured at a thickness of 0.8 mm. The polycarbonate blends may have a pFTP(V0) value of at least 0.80 or at least 0.90, when measured at a thickness of 0.8 mm. The polycarbonate blends may have a flame out time (FOT) of about 40 seconds or less, when measured at a thickness of 1.5 mm. The polycarbonate blends may have a flame out time (FOT) of about 30 seconds or less, when measured at a thickness of 1.5 mm. The polycarbonate blends may have a flame out time (FOT) of about 30 seconds or less, when measured at a thickness of 0.8 mm. A given polycarbonate blend can have any combination of these pFTP values and FOT values at either thickness.

In some specific embodiments, the polycarbonate blends have a pFTP(V0) of at least 0.90 and a flame out time (FOT) of about 30 seconds or less, when measured at a thickness of 1.5 mm.

In other specific embodiments, the polycarbonate blends have a pFTP(V0) of at least 0.90 and a flame out time (FOT) of about 30 seconds or less, when measured at a thickness of 0.8 mm.

In yet other embodiments, the polycarbonate blends have a pFTP(V0) of at least 0.80 and a flame out time (FOT) of about 40 seconds or less when measured at 1.5 mm thickness.

In additional embodiments, the polycarbonate blends have a pFTP(V1) of at least 0.90 when measured at 0.8 mm thickness and a flame out time (FOT) of about 40 seconds or less when measured at 1.5 mm thickness.

The polycarbonate blends of the present disclosure may have a tracking resistance that meets CTI PLC 2 standards. CTI (Comparative Tracking Index) is used to define the tendency of an electrical insulating material to fail due to tracking. Tracking is the process that produces a partially conducting path of localized deterioration on the surface of an insulating material as a result of the action of electric discharges on or close to an insulation surface. Failure occurs by shorting. Electrical tracking in a plastic can be a source of fire in plastic parts that are used in electrical applications, so tracking resistance is often an important safety requirement for a plastic.

The standard for CTI is ASTM D3638. Briefly, under this standard a square test piece (6 cm×6 cm) having a thickness of 3 mm is provided. Two electrodes are attached to the test piece, and a voltage is applied. Drops of 0.1% ammonium chloride solution (volume 20 mm$^3$/drop) are applied between the electrodes, and the number of drops needed to cause tracking is counted. At each voltage, five specimens are tested, and the average number of drops is recorded. This procedure is repeated at four or more different voltages, and two data points should have more than 50 drops and two data points should have less than 50 drops. Then, a graph of the number of drops vs. voltage is plotted using those data points, and the voltage at which 50 drops causes tracking is extrapolated. If the extrapolated voltage is 250 volts or higher, then CTI PLC 2 standards have been met.

The standard test method described above can be somewhat long and cumbersome. A shorthand method is to apply a voltage of 250 volts and then continue to apply drops until tracking occurs. If 50 or more drops are needed to cause tracking, then this is a good sign that CTI PLC 2 standards will be met using the standard test method of ASTM D3638. For purposes of this application, CTI PLC 2 standards are considered to be met if either (i) the shorthand method is used and 50 or more drops are needed to cause tracking; or (ii) the standard test method of ASTM D3638 is followed.

The polycarbonate blends of the present disclosure can pass a ball point pressure (BPT) test at 125° C. This test measures the relationship between the degree of deformation and the temperature when a test specimen is subjected to a constant load, and is related to the Vicat softening temperature. The standard for the BPT is IEC 60335-1. Briefly, a test piece having a thickness of 3 mm is provided. A ball of diameter 5 mm is subjected to a load of 20 newtons for 60 minutes at the stated temperature, and the diameter of the resulting indentation is then measured. If the indentation has a diameter of less than 2 mm, then the ball pressure test is passed at the stated temperature. If the indentation has a diameter of 2 mm or greater, then the ball pressure test is failed at the stated temperature.

The polycarbonate blends of the present disclosure may exhibit a notched Izod impact strength (INI) measured according to ISO 180 of at least 20 kJ/m$^2$, when measured at −30° C., 5 kg, and 3.0 mm thickness. In some embodiments, the notched Izod impact strength of the composition is at least 25 kJ/m$^2$, or at least 30 kJ/m$^2$, or at least 35 kJ/m$^2$, or at least 40 kJ/m$^2$, or at least 45 kJ/m$^2$, or at least 50 kJ/m$^2$.

The polycarbonate blends of the present disclosure may have any combination of these properties (FR performance, tracking resistance, BPT, INI, ductility), and any combination of the listed values for these properties. It should be noted that many of these properties (e.g. INI) are measured using articles made from the polycarbonate blend; however, such properties are described as belonging to the polycarbonate blend for ease of reference.

In some specific embodiments, the blend meets CTI PLC 2 standards; and has a flame out time (FOT) of about 40 seconds or less at 1.5 mm thickness.

In other specific embodiments, the blend meets CTI PLC 2 standards; has a FOT of about 40 seconds or less at 1.5 mm thickness; and passes the ball pressure test (BPT) at 125° C.

In additional specific embodiments, the blend meets CTI PLC 2 standards; has a FOT of about 40 seconds or less at 1.5 mm thickness; and has a pFTP(V1) value of at least 0.90 at 0.8 mm thickness.

In various specific embodiments, the blend meets CTI PLC 2 standards; and has a pFTP(V0) value of at least 0.80 and a FOT of about 40 seconds or less at 1.5 mm thickness.

In some specific embodiments, the blend meets CTI PLC 2 standards; has a FOT of about 40 seconds or less at 1.5 mm thickness; and has 100% ductility at −30° C.

In narrower specific embodiments, the blend meets CTI PLC 2 standards; has a FOT of about 40 seconds or less at 1.5 mm thickness; and has a notched Izod impact strength (INI) at −30° C. of at least 35 kJ/m$^2$ when measured according to ISO 180.

In other specific embodiments, the blend meets CTI PLC 2 standards; has a FOT of about 40 seconds or less at 1.5 mm thickness; and has a pFTP(V0) of at least 0.90 and a FOT of about 30 seconds or less at 0.8 mm thickness.

In still more specific embodiments, the blend meets CTI PLC 2 standards; and has a pFTP(V0) of at least 0.80 and a FOT of about 40 seconds or less at 1.5 mm thickness.

In desirable specific embodiments, the blend meets CTI PLC 2 standards; has a FOT of about 40 seconds or less at 1.5 mm thickness; passes the ball pressure test (BPT) at 125° C.; and has 100% ductility at −30° C.

In other specific embodiments, the blend meets CTI PLC 2 standards; has a FOT of about 40 seconds or less at 1.5 mm thickness; has a pFTP(V0) of at least 0.80 and a FOT of about 40 seconds or less at 0.8 mm thickness; passes the ball pressure test (BPT) at 125° C.; and has 100% ductility at −30° C.

In various specific embodiments, the blend meets CTI PLC 2 standards; has a FOT of about 40 seconds or less at 1.5 mm thickness; passes the ball pressure test (BPT) at 125°

C.; has 100% ductility at −30° C.; and has an INI at −30° C. of at least 35 kJ/m² when measured according to ISO 180.

In very specific embodiments, the blend meets CTI PLC 2 standards; has a FOT of about 40 seconds or less at 1.5 mm thickness; has a pFTP(V0) of at least 0.90 and a FOT of about 30 seconds or less at 0.8 mm thickness; passes the ball pressure test (BPT) at 125° C.; and has an INI at −30° C. of at least 20 kJ/m² when measured according to ISO 180; and passes the ball pressure test (BPT) at 125° C.

Other additives ordinarily incorporated in polycarbonate blends of this type can also be used, with the proviso that the additives are selected so as to not significantly adversely affect the desired properties of the polycarbonate. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, and gamma-stabilizing agents.

Exemplary antioxidant additives include, for example, organophosphites such as tris(nonyl phenyl)phosphite, tris (2,4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl) oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH2OH) or it can be a member of a more complex hydrocarbon group such as —CR⁴HOH or —CR⁴OH wherein R⁴ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization.

Gamma-radiation stabilizing compounds are typically used in amounts of 0.1 to 10 wt % of the overall polycarbonate composition.

The polycarbonate compositions of the present disclosure may be molded into pellets. The compositions may be molded, foamed, or extruded into various structures or articles by known methods, such as injection molding, overmolding, extrusion, rotational molding, blow molding and thermoforming.

In particular, it is contemplated that the polycarbonate compositions of the present disclosure are used to mold thin-wall articles, particularly for electrical application. Non-limiting examples of such articles include a solar apparatus, an electrical junction box, an electrical connector, an electrical vehicle charger, an outdoor electrical enclosure, a smart meter enclosure, a smart grid power node, a photovoltaic frame, and a miniature circuit breaker.

The present disclosure further contemplates additional fabrication operations on said articles, such as, but not limited to, molding, in-mold decoration, baking in a paint oven, lamination, and/or thermoforming. The polycarbonate compositions are especially useful for making articles that have parts with a wall thickness of 1.5 mm or less, or 0.8 mm or less. It is recognized that molded parts can have walls that vary in thickness, and these values refer to the thinnest parts of those walls, or the "thinnest thickness". Put another way, the article has at least one wall that is 1.5 mm/0.8 mm or less in thickness.

The following examples are provided to illustrate the polycarbonate blends of the present disclosure. The examples are merely illustrative and are not intended to limit the disclosure to the materials, conditions, or process parameters set forth therein.

EXAMPLES

The following table lists the names and descriptions of the ingredients used in the following Examples.

| Ingredient | Description | Trade name | Supplier |
|---|---|---|---|
| PC-1 | Bisphenol-A homopolymer; Mw of 30,000-31,000 | LEXAN | SABIC Innovative Plastics |
| PC-2 | Bisphenol-A homopolymer; Mw of 21,000-22,000 | LEXAN | SABIC Innovative Plastics |
| PC-ST | a BPA polycarbonate-polydimethylsiloxane copolymer comprising about 20% by weight of siloxane, 80% by weight of BPA, PCP (p-cumylphenol) endcapped, siloxane chain length is ~35-55; Mw of 30,000 | LEXAN | SABIC Innovative Plastics |
| HHPC-1 | a copolymer of bisphenol-A and 2-phenyl-3,3-bis(4-hydroxyphenyl) phthalimidine, 32 mole % PPPBP; Mw of 23,000-27,000 | | SABIC Innovative Plastics |
| HHPC-2 | Polyphthalate carbonate copolymer | | |
| PEI | Polyetherimide | | |
| HHPC-3 | a copolymer of bisphenol-A and cyclohexyl bisphenol | APEC 1803 | |
| BPADP | Bisphenol A diphosphate (8.9% P) | NcendX P-30 | Albemarle |
| KSS | Potassium diphenylsulphon-3-sulphonate | KSS | Arichem LLC |
| Rimar | Potassium perfluorobutanesulfonate | Bayowet C4 | Lanxess |
| TSAN | SAN encapsulated PTFE | TSAN | SABIC Innovative Plastics |
| PETS | Pentaerythritol tetrastearate, >90% esterified, mold release agent | PETS G | Faci |
| Phosphite | Tris(2,4-di-tert-butylphenyl)phosphite | Irgafos 168 | Ciba |
| UVA 234 | 2-(2-hydroxy-3,5-dicumyl) benzotriazole | TINUVIN 234 | Ciba |
| TiO$_2$ type 1 | Titanium dioxide | KRONOS 2450 | Kronos |
| TiO$_2$ type 2 | Titanium dioxide | KRONOS 2233 | Kronos |
| CB | Carbon black | Printex 85 | Degussa |

The notched Izod impact strength (INI) was measured using ISO 180, 5 kg, 23° C., and 3.0 mm thickness. INI was measured at 23° C. and at −30° C. to test for low temperature impact/ductility.

Flammability tests were performed following the procedure of Underwriter's Laboratory Bulletin 94 entitled "Tests for Flammability of Plastic Materials, UL94." According to this procedure, materials may be classified as V-0, V-1 or V-2 on the basis of the test results obtained for samples of a given thickness. It is assumed that a material that meets a given standard at a given thickness can also meet the same standard at greater thicknesses (e.g. a material that obtains V0 performance at 0.8 mm thickness can also obtain V0 performance at 1.0 mm thickness, 1.5 mm, etc.). The samples are made according to the UL94 test procedure. Samples were burned in a vertical orientation after aging for 48 hours at 23° C. At least 10 injection molded bars were burned for each UL test. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bars flame out time (FOT) is the sum of the flame out time for five bars each lit twice for ten (10) seconds each, for a maximum flame out time of 50 seconds. FOT1 is the average flame out time after the first light. FOT2 is the average flame out time after the second light.

V-1, V-2: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton. The V2 standard is the same as V-1, except that flaming drips that ignite the cotton are permitted. Five bar flame out time (FOT) is the sum of the flame out time for five bars, each lit twice for ten (10) seconds each, for a maximum flame out time of 250 seconds.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$\text{PFTP} = (P_{t1>mbt,n=0} \times P_{t2>mbt,n=0} \times P_{total<=mbt} \times P_{drip,n=0})$$

where $P_{t1>mbt, n=0}$ is the probability that no first burn time exceeds a maximum burn time value, $P_{t2>mbt, n=0}$ is the probability that no second burn time exceeds a maximum burn time value, $P_{total<=mtbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined from the formula: $P_{t1>mbt, n=0}=(1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt, n=0}=(1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip, n=0}$ that no specimen exhibits dripping during the flame test is an attribute function, estimated by: $(1-P_{drip})^5$ where $P_{drip}$=(the number of bars that drip/the number of bars tested).

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

Preferably, p(FTP) is as close to 1 as possible, for example, greater than or equal to about 0.80, or greater than or equal to about 0.90, or greater than or equal to about 0.95, for maximum flame-retardant performance in UL testing. These standards are more stringent than merely specifying compliance with the referenced V-0 or V-1 test.

For the CTI values reported in the Examples, drops of 0.1% ammonium chloride solution were applied, the voltage was maintained at 250V, and the number of drops needed to cause tracking was counted. A maximum of 100 drops was applied. The higher the number of drops, the higher the tracking resistance of the Example was. In order to meet CTI PLC 2 standards, the number of drops must be 50 or higher.

First Set of Examples

Several blends were made with different flame retardants and two different kinds of titanium dioxide for comparison. Those results are shown in Table 1.

Comparing CEx-1 through CEx-4, it was found that the CTI performance of the blend was improved by the addition of BPADP (Cex.4 versus Cex.1), whereas two common non-brominated flame retardant additives (KSS and Rimar) significantly reduced the CTI performance. However, CEx-4 had poor low temperature ductility and the pFTP(V0) performance was poor. If no $TiO_2$ is added, the 1.5 mm V0 performance is attained, but at the cost of the CTI performance, and low temperature ductility was still poor (CEx-5). The type of $TiO_2$ used affected both the impact and flame retardance performance (CEx-4 vs. CEx-6).

TABLE 1

| Ingredient | Unit | CEx-1 | CEx-2 | CEx-3 | CEx-4 | CEx-5 | CEx-6 |
|---|---|---|---|---|---|---|---|
| PC-2 | wt % | 40.77 | 40.62 | 40.72 | 36.77 | 39.27 | 36.77 |
| PC-1 | wt % | 40.77 | 40.62 | 40.72 | 42.77 | 45.27 | 42.77 |
| PC-ST | wt % | 12.5 | 12.5 | 12.5 | 12.5 | 12.5 | 12.5 |
| TiO2 Type 1 | wt % | 5 | 5 | 5 | 5 | | |
| TiO2 Type 2 | wt % | | | | | | 5 |
| KSS | wt % | | 0.3 | | | | |
| Rimar | wt % | | | 0.1 | | | |
| BPADP | wt % | | | | 2 | 2 | 2 |
| TSAN | wt % | 0.3 | 0.3 | 0.3 | 0.3 | 0.3 | 0.3 |
| Additives | wt % | 0.66 | 0.66 | 0.66 | 0.66 | 0.66 | 0.66 |
| INI 23° C. | kJ/m² | 64 | | 63 | 63 | 69 | 67 |
| INI -30° C. | kJ/m² | 53 | | 54 | 20 | 17 | 38 |
| Ductility 23° C. | % | 100 | | 100 | 100 | 100 | 100 |
| Ductility -30° C. | % | 100 | | 100 | 0 | 0 | 67 |
| FOT 5 bars, 1.5 mm | sec | 293 | 51 | 185 | 144 | 19 | 47 |
| pFTP(V0), 1.5 mm | — | 0.00 | 0.11 | 0.00 | 0.00 | 1.00 | 0.12 |
| CTI, 250 V | drops | 59 | 27 | 15 | 100 | 31 | 100 |

*Additives: 0.3% PETS, 0.06% phosphite, 0.3% UVA 234

Second Set of Examples

In Table 2, the amounts of EXL and BPADP were varied. It is believed that the higher EXL level improved the low temperature ductility. 3 wt % BPADP provided a robust 1.5 mm pFTP(V0) rating (CEx-10). At this high level of BPADP, however the heat resistance will be so low that it is expected to fail the ball pressure test at 125° C. The addition of HHPC-1 should restore the heat resistance, but in this case low temperature ductility again was lost (CEx-11).

TABLE 2

| | | CEx-1 | CEx-7 | CEx-8 | CEx-9 | CEx-10 | CEx-11 |
|---|---|---|---|---|---|---|---|
| PC 105 | wt % | 40.77 | 40.8 | 40.8 | 41.3 | 41.3 | 37.3 |
| PC 175 | wt % | 40.77 | 33.3 | 33.3 | 32.3 | 32.3 | 32.3 |
| EXL | wt % | 12.5 | 17.5 | 17.5 | 17.5 | 17.5 | 17.5 |
| HHPC-1 | wt % | | | | | | 8 |
| TiO2 Type 1 | wt % | 5 | 5 | | 5 | | 5 |
| TiO2 Type 2 | wt % | | | 5 | | 5 | |
| BPADP | wt % | | 2.5 | 2.5 | 3 | 3 | 3 |
| TSAN | wt % | 0.3 | 0.3 | 0.3 | 0.3 | 0.3 | 0.3 |
| Additives | wt % | 0.66 | 0.66 | 0.66 | 0.66 | 0.66 | 0.66 |
| INI 23° C. | kJ/m² | 64 | 68 | 70 | 68 | 70 | 63 |
| INI −30° C. | kJ/m² | 53 | 52 | 55 | 51 | 53 | 23 |
| Ductility 23° C. | % | 100 | 100 | 100 | 100 | 100 | 100 |
| Ductility −30° C. | % | 100 | 100 | 100 | 100 | 100 | 0 |

| Flammability | | t1 | t2 | t1 | t2 | t1 | t2 | t1 | t2 | t1 | t2 | t1 | t2 |
|---|---|---|---|---|---|---|---|---|---|---|---|---|---|
| @ 1.5 mm 23° C./48 hours | | 2.7 | 52 | 1 | 1.1 | 1 | 1.2 | 1 | 1.1 | 1.9 | 3.5 | 2.2 | 1.2 |
| | | 5.2 | 50 | 1 | 1.2 | 1 | 8.7 | 7.9 | 1.3 | 1.2 | 5.6 | 1 | 1 |
| | | | | 1 | 1 | 2.8 | 1 | 2.5 | 1.5 | 1.2 | 5.8 | 1.2 | 2 |
| | | | | 2.2 | 17.5 | 1 | 1.1 | 2.5 | 1.2 | 1.1 | 2.8 | 1.1 | 1.9 |
| | | | | 1.1 | 1.1 | 6.8 | 5.3 | 3.3 | 1.5 | 1.1 | 6.1 | 1 | 1.2 |
| | | | | 3.9 | 1.1 | 1.1 | 50 | 0.8 | 9.7 | 1.1 | 5.9 | 1 | 0.8 |
| | | | | 3.7 | 1.2 | 1.1 | 1.1 | 4.7 | 1.1 | 1.1 | 6 | 0.9 | 1 |
| | | | | 2.3 | 30.4 | 1.5 | 10.5 | 1.3 | 1.1 | 1.1 | 2.9 | 1 | 1.1 |
| | | | | 1.1 | 1.6 | 3 | 19.4 | 1 | 1.2 | 1 | 4.6 | 1 | 1.2 |
| | | | | 1.1 | 1.2 | 4.5 | 18 | 4.2 | 4.9 | 1.2 | 3.3 | 1.2 | 1.3 |

| | | CEx-1 | CEx-7 | CEx-8 | CEx-9 | CEx-10 | CEx-11 |
|---|---|---|---|---|---|---|---|
| drips | # | 1 | 0 | 0 | 0 | 0 | 0 |
| FOT (10 bars) | sec | | 76 | 140 | 54 | 59 | 24 |
| Average FOT (5 bars) | sec | 293 | 38 | 70 | 27 | 29 | 12 |
| | | 0 | 0.49 | 0.05 | 0.84 | 0.97 | 1 |
| UL94 rating | | NR | V1 | V1 | V0 | V0 | V0 |
| CTI, 250 V | drops | 59 | 100 | 100 | 100 | 100 | 100 |

*Additives: 0.3% PETS, 0.06% phosphite, 0.3% UVA 234

Third Set of Examples

In Table 3, the amount of BPADP was varied. According to the results, only at 5% or 10% BPADP is a 1.5 mm V0 rating or a 0.8 mm V1 rating obtained. However, at these levels the BPT was failed.

TABLE 3

| | | CEx-12 | CEx-13 | CEx-14 | CEx-15 |
|---|---|---|---|---|---|
| PC-1 | wt % | 36.02 | 35.77 | 34.52 | 32.02 |
| PC-2 | wt % | 36.02 | 35.77 | 34.52 | 32.02 |
| PC-ST | wt % | 20 | 20 | 20 | 20 |
| TiO2 Type 2 | wt % | 5 | 5 | 5 | 5 |
| BPADP | wt % | 2 | 2.5 | 5 | 10 |
| TSAN | wt % | 0.3 | 0.3 | 0.3 | 0.3 |
| Additives | wt % | 0.66 | 0.66 | 0.66 | 0.66 |
| Vicat B120 | ° C. | 138.1 | 132.2 | 124.1 | 109.7 |
| BPT, 125° C. | — | Pass | Pass | Fail | Fail |
| INI 23° C. | kJ/m² | 74 | 83 | 75 | 61 |
| INI −30° C. | kJ/m² | 63 | 64 | 55 | 18 |
| Ductility 23° C. | % | 100 | 100 | 100 | 100 |
| Ductility −30° C. | % | 100 | 100 | 100 | 0 |
| MVR | cm³/10 min | 11.1 | 12.4 | 14.7 | 21.4 |

| Flammability | | t1 | t2 | t1 | t2 | t1 | t2 | t1 | t2 |
|---|---|---|---|---|---|---|---|---|---|
| at 0.8 mm 23° C./48 hrs | | 4.3 | 25.5 | 2.2 | 4 | 1 | 2.6 | 3 | 7.2 |
| | | 9.2 | 9.3 | 5.3 | 16.1 | 2.4 | 2.5 | 3.9 | 1.9 |
| | | 6.5 | 27.5 | 3.8 | 2.1 | 1.1 | 11.5 | 1.5 | 5 |
| | | 15.8 | 1.9 | 3 | 5.5 | 2.9 | 2.3 | 1.2 | 5.8 |
| | | 9 | 13.5 | 4.8 | 5.5 | 2 | 6.1 | 3 | 6.5 |

| | | CEx-12 | CEx-13 | CEx-14 | CEx-15 |
|---|---|---|---|---|---|
| FOT (5 bars) | sec | 123 | 52 | 34 | 39 |
| % burning drips failure | % | 20 | 0 | 0 | 0 |
| 0.8 mm pFTP(V0) | | 0 | 0.14 | 0.55 | 0.56 |
| 0.8 mm pFTP(V1) | | 0.13 | 0.95 | 0.99 | 1 |
| UL94 Rating | | NR | V1 | V0 | V0 |

TABLE 3-continued

| Flammability | | t1 | t2 | t1 | t2 | t1 | t2 | t1 | t2 |
|---|---|---|---|---|---|---|---|---|---|
| at 1.5 mm 23° C./48 hrs | | 1.4 | 7 | 1.8 | 11.5 | 1.1 | 4 | 0.9 | 1.1 |
| 1.2 | | 7.3 | 1 | 13 | 1 | 4.6 | 1.2 | 1.9 | |
| | | 8.9 | 9.5 | 1.1 | 18.5 | 1.3 | 4.8 | 1 | 3.1 |
| | | 2.8 | 22 | 1.1 | 7.8 | 2.5 | 3.8 | 1 | 1.7 |
| | | 1.2 | 20.9 | 3.2 | 1.3 | 1.9 | 1.7 | 1 | 1.7 |
| FOT (5 bars) | sec | 82 | | 60 | | 27 | | 15 | |
| % burning drips failure | % | 0 | | 0 | | 0 | | 0 | |
| 1.5 mm pFTP(V0) | | 0 | | 0.02 | | 0.96 | | 1 | |
| UL94 Rating | | V1 | | V1 | | V0 | | V0 | |
| CTI, 250 V | drops | 100 | | 100 | | 100 | | 100 | |

*additives: 0.3% PETS, 0.06% phosphite, 0.3% UV

Fourth Set of Examples

In Table 4, several different high heat resins were blended into the blend to determine whether their inclusion would permit the BPT to be passed. CEx-17 through CEx-19 show that 15-20 wt % XHT is needed to pass the BPT and to get good 0.8 mm V1 and 1.5 mm V0 performance. No loss in CTI performance or low temperature impact was observed. PPC (CEx-18) was less effective and at 15 wt % still failed the BPT and could not achieve V0 performance at 1.5 mm thickness. Ultem (CEx-19) had no effect. APEC (CEx-20) led to a decrease in FR performance, as evidenced by higher FOTs and lower pFTP(V0) at 1.5 mm. CEx-21 showed that using a polycarbonate of lower molecular weight achieved pFTP(V1) performance at 0.8 mm thickness, but still did not achieve V0 performance. These examples showed that various high heat resins behaved differently and unpredictably.

Fifth Set of Examples

In Table 5, additional variations were made to determine the relative effects of amounts of each ingredient on the resulting properties. Ex-3 through Ex-5 showed that 0.8 mm V0 performance could be reached by increasing the TSAN level, but some low temperature ductility was lost. Ex-6, Ex-7, and CEx-22 showed that a decrease in $TiO_2$ level caused both the CTI performance and the low temperature INI to decrease. Ex-8 and Ex-9 showed that the use of carbon black maintained the FR performance.

Sixth Set of Examples 30 different examples were prepared, and are numbered from Ex-1 to Ex-30 in Tables 6A, 6B, and 6C. These examples are different from the first through fifth sets of examples described above (e.g., Ex-1 in this sixth set does not correspond to the Ex-1 in the fourth set).

Based on these 30 examples, three equations were generated that provided a model fit to each desired property (BPT indentation, Vicat, and INI at −30° C.). The parameters for these equations were the amount of high heat polycarbonate resin (HHPC-1); the amount of BPADP; and the amount of PC-ST. The three equations are shown below. It is noted that the BPT value refers to the indentation (mm), not the temperature. It should also be noted that the term (HHPC-1) is a label, and should not be construed as "HHPC minus one".

TABLE 4

| | | CEx-16 | CEx-17 | Ex-1 | Ex-2 | CEx-18 | CEx-19 | CEx-20 | CEx-21 |
|---|---|---|---|---|---|---|---|---|---|
| PC-1 | wt % | 70.04 | 60.04 | 55.04 | 50.04 | 55.04 | 55.04 | 50.04 | 27.52 |
| PC-2 | wt % | | | | | | | | 27.52 |
| PC-ST | wt % | 20 | 20 | 20 | 20 | 20 | 20 | 20 | 20 |
| HHPC-1 | wt % | | 10 | 15 | 20 | | | | |
| HHPC-2 | wt % | | | | | 15 | | | |
| PEI | wt % | | | | | | 15 | | |
| HHPC-3 | wt % | | | | | | | 20 | |
| TiO2 Type 2 | wt % | 5 | 5 | 5 | 5 | 5 | 5 | 5 | 5 |
| BPADP | wt % | 4 | 4 | 4 | 4 | 4 | 4 | 4 | 4 |
| TSAN | wt % | 0.3 | 0.3 | 0.3 | 0.3 | 0.3 | 0.3 | 0.3 | 0.3 |
| Additives | wt % | 0.66 | 0.66 | 0.66 | 0.66 | 0.66 | 0.66 | 0.66 | 0.66 |
| Vicat B120 | ° C. | 127.9 | 131.6 | 134.2 | 136.3 | 131.3 | 127.9 | 132.8 | 133.9 |
| BPT, 125° C. | — | Fail | Fail | Pass | Pass | Fail | Fail | Pass | Pass |
| INI 23° C. | kJ/m² | 80 | 74 | 68 | 64 | 74 | 35 | 72 | 75 |
| INI −30° C. | kJ/m² | 67 | 55 | 49 | 40 | 53 | 21 | 47 | 44 |
| Ductility 23° C. | % | 100 | 100 | 100 | 100 | 100 | 100 | 100 | 100 |
| Ductility −30° C. | % | 100 | 100 | 100 | 100 | 100 | 0 | 100 | 100 |
| MVR | cm³/10 min | 6.0 | 5.5 | 5.4 | 5.3 | 4.6 | 4.5 | 5.1 | 8.2 |
| Flammability | — | t1 t2 | t1 t2 | t1 t2 | t1 t2 | t1 t2 | t1 t2 | t1 t2 | t1 t2 |
| at 0.8 mm 23° C./48 hrs | | 12.3 1.2 | 6.7 2.7 | 5.6 15.1 | 10.1 1.9 | 14.5 3.5 | 20.5 2.1 | 22.4 15.8 | 3.3 4.4 |
| | | 4.1 20.2 | 9.4 1.8 | 4.9 14.5 | 10.4 3.8 | 7.7 20.4 | 29.1 2.5 | 7.9 34.7 | 3.2 12.8 |
| | | 13 1.4 | 11.1 1.4 | 7.1 1.5 | 3.2 7.6 | 3.6 9.7 | 20.2 2 | 19.7 3.9 | 2.8 4.2 |
| | | 7.9 1.3 | 7.2 3.4 | 3.9 3.5 | 6.8 3 | 16.1 2.9 | 32.9 1.5 | 17.7 2.2 | 4.3 1.2 |
| | | 4.7 23.3 | 7.9 11.3 | 12.9 2.7 | 8.2 9.4 | 11.2 3.8 | 28.5 1.4 | 17.3 3.7 | 2.9 4.2 |
| | | | | | | | | | 2.5 9.6 |
| | | | | | | | | | 2.1 2 |
| | | | | | | | | | 5.8 3.6 |

TABLE 4-continued

|  |  |  |  |  |  |  |  |  |
|---|---|---|---|---|---|---|---|---|
|  |  |  |  |  |  |  | 7.8 | 1.4 |
|  |  |  |  |  |  |  | 6.7 | 1.5 |

| | | | | | | | | |
|---|---|---|---|---|---|---|---|---|
| FOT (5 bars) | sec | 89 | 63 | 72 | 64 | 93 | 141 | 145 | 43 |
| 0.8 mm pFTP (V0) | | 0.00 | 0.01 | 0.01 | 0.01 | 0.00 | 0.00 | 0.00 | 0.44 |
| 0.8 mm pFTP (V1) | | 0.57 | 0.99 | 0.81 | 0.98 | 0.76 | 0.25 | 0.40 | 0.98 |

| Flammability | | t1 | t2 | t1 | t2 | t1 | t2 | t1 | t2 | t1 | t2 | t1 | t2 | t1 | t2 | t1 | t2 |
|---|---|---|---|---|---|---|---|---|---|---|---|---|---|---|---|---|---|
| at 1.5 mm 23° C./48 hrs | | 1 | 5.7 | 0.9 | 1.4 | 1 | 2 | 1 | 2.6 | 1 | 9.8 | 4 | 3.5 | 1.2 | 5.4 | 1.1 | 7.2 |
| | | 1 | 8.3 | 1 | 4.8 | 0.9 | 5.7 | 1 | 1.7 | 2.1 | 17.3 | 1.1 | 4.1 | 1 | 3.5 | 1 | 1.3 |
| | | 1.3 | 4.9 | 1 | 4.3 | 1.2 | 6.7 | 1.4 | 6.2 | 1.1 | 9.8 | 1 | 11.3 | 1 | 2.8 | 1.9 | 4.8 |
| | | 1 | 5.1 | 1 | 8.6 | 1 | 8.2 | 1 | 4.8 | 1.1 | 1.3 | 1 | 13 | 2.7 | 11.5 | 1.9 | 1.9 |
| | | 0.9 | 1.9 | 1 | 1.2 | 1 | 11.2 | 1 | 1.4 | 1 | 1.2 | 1.9 | 1.9 | 2 | 19.8 | 1 | 5 |
| | | 0.9 | 3.3 | 1 | 1.9 | 1 | 9 | 1.9 | 2.6 | 1 | 2.8 | 1 | 2.8 | 1.4 | 1.5 | 1.1 | 4.7 |
| | | 0.9 | 6.9 | 1.4 | 9.6 | 1.1 | 3.1 | 1.7 | 8 | 1.1 | 6.5 | 1.6 | 3.2 | 4.8 | 15.6 | 1 | 5.1 |
| | | 1.1 | 8.6 | 1.1 | 8.4 | 1.7 | 5.4 | 1.1 | 3.9 | 1.4 | 5.9 | 0.9 | 3 | 1.1 | 12.5 | 1.1 | 1.8 |
| | | 1.1 | 5.2 | 1 | 7.2 | 1.1 | 3.9 | 1.2 | 5.4 | 1 | 1.4 | 1.1 | 1.7 | 1 | 23.1 | 0.9 | 9.3 |
| | | 1.1 | 2.6 | 1.2 | 2 | 1.5 | 5.2 | 1 | 8.9 | 1 | 4.6 | 1.5 | 2.7 | 1 | 1.5 | 0.9 | 8.7 |

| | | | | | | | | | |
|---|---|---|---|---|---|---|---|---|---|
| FOT (10 bars) | sec | 62.8 | 60.0 | 71.9 | 57.8 | 72.4 | 62.3 | 114.4 | 61.7 |
| average FOT (5 bars) | sec | 31 | 30 | 36 | 29 | 36 | 31 | 57 | 31 |
| 1.5 mm pFTP (V0) | | 0.71 | 0.51 | 0.50 | 0.70 | 0.29 | 0.68 | 0.05 | 0.57 |
| CTI, 250 V | drops | 98 | 87 | 100 | 100 | 100 | 63 | 100 | 100 |

*additives: 0.3% PETS, 0.06% phosphite 168, 0.3% UVA234

TABLE 5

| | | Ex-3 | Ex-4 | Ex-5 | Ex-6 | Ex-7 | CEx-22 | Ex-8 | Ex-9 |
|---|---|---|---|---|---|---|---|---|---|
| PC-1 | wt % | 55.04 | 54.74 | 55.19 | 56.04 | 57.04 | 58.04 | 55.54 | 57.54 |
| PC-ST | | 20 | 20 | 20 | 20 | 20 | 20 | 20 | 20 |
| HHPC-1 | wt % | 15 | 15 | 15 | 15 | 15 | 15 | 15 | 15 |
| TiO2 Type 2 | wt % | 5 | 5 | 5 | 4 | 3 | 2 | 4 | 2 |
| CB | wt % | — | — | — | — | — | — | 0.5 | 0.5 |
| BPADP | wt % | 4 | 4 | 4 | 4 | 4 | 4 | 4 | 4 |
| TSAN | wt % | 0.3 | 0.6 | 0.15 | 0.3 | 0.3 | 0.3 | 0.3 | 0.3 |
| Additives | wt % | 0.66 | 0.66 | 0.66 | 0.66 | 0.66 | 0.66 | 0.66 | 0.66 |
| Vicat B120 | ° C. | 135 | 134.2 | 136.2 | 135.1 | 134.4 | 134.4 | 134.7 | 134.5 |
| BPT indentation | mm | 1.3 | 1.3 | 1.3 | 1.5 | 1.7 | 1.4 | 1.6 | 1.7 |
| BPT, 125° C. | — | Pass | Pass | Pass | Pass | Pass | Pass | Pass | Pass |
| INI 23° C. | kJ/m$^2$ | 71 | 64 | 69 | 69 | 71 | 70 | 67 | 68 |
| INI −30° C. | kJ/m$^2$ | 48 | 34 | 54 | 48 | 40 | 27 | 27 | 22 |
| Ductility 23° C. | % | 100 | 100 | 100 | 100 | 100 | 100 | 100 | 100 |
| Ductility −30° C. | % | 100 | 20 | 100 | 100 | 75 | 0 | 0 | 0 |
| MVR | cm$^3$/10 min | 6 | 5.2 | 6.4 | 5.8 | 5.9 | 5.8 | 5.8 | 5.9 |

| Flammability | | t1 | t2 | t1 | t2 | t1 | t2 | t1 | t2 | t1 | t2 | t1 | t2 | t1 | t2 | t1 | t2 |
|---|---|---|---|---|---|---|---|---|---|---|---|---|---|---|---|---|---|
| at 0.8 mm 23° C./48 hrs | | 6.3 | 1.7 | 7.9 | 1.6 | 13.4 | 1.5 | 8.1 | 2.4 | 6 | 3.2 | 6.8 | 2.8 | 5 | 2.4 | 2.3 | 2.7 |
| | | 8.5 | 1.3 | 10.2 | 1.8 | 15.5 | 1.5 | 4.9 | 2.9 | 7.6 | 1.6 | 7.9 | 1.9 | 2.5 | 2.1 | 2.6 | 1.5 |
| | | 10.9 | 5.2 | 3.3 | 6.4 | 9.2 | 25.3 | 8 | 1.5 | 8.6 | 1.4 | 8.6 | 2 | 4.9 | 1.8 | 1.8 | 6.7 |
| | | 11.7 | 1.4 | 2.9 | 2.2 | 13.9 | 4.6 | 9.6 | 1.7 | 7.8 | 1.8 | 6.2 | 1.5 | 1.3 | 10.4 | 1.1 | 2.4 |
| | | 10.4 | 2.1 | 4.6 | 1.5 | 13.7 | 3.7 | 5.7 | 1.6 | 5.1 | 1.5 | 3.6 | 7.9 | 1.8 | 2.9 | 3.3 | 2.1 |
| | | 9.3 | 2.6 | 3 | 3.4 | 9.6 | 3.7 | 9.5 | 1.9 | 4.3 | 4.7 | 6.7 | 1.7 | 1.3 | 1.7 | 1.1 | 1.8 |
| | | 10.6 | 3.6 | 2.2 | 4.6 | 9.6 | 3.8 | 5.7 | 2.8 | 6.2 | 3.1 | 3 | 1.8 | 1.5 | 1.6 | 1.1 | 1.6 |
| | | 9.4 | 2.1 | 4.1 | 3 | 7.5 | 4.2 | 9.1 | 1.7 | 9.5 | 1.7 | 7.8 | 2.7 | 5.3 | 2.4 | 1.2 | 1.8 |
| | | 10.7 | 12.7 | 6.1 | 2.8 | 16.3 | 2.1 | 6.1 | 5.9 | 8.1 | 1.7 | 7.9 | 2.3 | 1.9 | 1.5 | 2.1 | 2.4 |
| | | 1.7 | 4.1 | 3.1 | 5.2 | 13.5 | 1.4 | 11.1 | 1.6 | 6.5 | 1.5 | 3.3 | 2.5 | 1.9 | 1.7 | 1.9 | 1.6 |

| | | | | | | | | | |
|---|---|---|---|---|---|---|---|---|---|
| FOT (10 bars) | sec | 126.3 | 79.9 | 174 | 101.8 | 91.9 | 88.9 | 55.9 | 43.1 |
| AVERAGE FOT (5 bars) | sec | 63 | 40 | 87 | 51 | 46 | 44 | 28 | 22 |
| 0.8 mm pFTP(V0) | | 0.01 | 0.72 | 0.00 | 0.20 | 0.60 | 0.50 | 0.95 | 0.95 |
| 0.8 mm pFTP(V1) | | 0.94 | 1.00 | 0.97 | 1.00 | 1.00 | 1.00 | 1.00 | 1.00 |

| Flammability | | t1 | t2 | t1 | t2 | t1 | t2 | t1 | t2 | t1 | t2 | t1 | t2 | t1 | t2 | t1 | t2 |
|---|---|---|---|---|---|---|---|---|---|---|---|---|---|---|---|---|---|
| at 1.5 mm 23° C./48 hrs | | 1 | 2.4 | 1.6 | 2.7 | 1 | 6.1 | 0.9 | 2.3 | 0.5 | 4.1 | 2.1 | 0.9 | 0.5 | 1.3 | 0.5 | 0.8 |
| | | 1.8 | 1.5 | 1.1 | 4.8 | 1 | 0.5 | 0.6 | 6.2 | 1 | 2.6 | 0.5 | 1.5 | 1.1 | 0.3 | 0.8 | 1.3 |
| | | 1.1 | 1.3 | 0.8 | 8.2 | 0.6 | 3.6 | 0.5 | 3.1 | 1.1 | 1 | 1.2 | 1.1 | 1.3 | 1.7 | 0.5 | 1.7 |
| | | 1.6 | 1.9 | 1.6 | 1 | 1.1 | 5.3 | 0.5 | 4.2 | 0.5 | 1.2 | 1.5 | 2.4 | 0.5 | 1.2 | 0.6 | 2.5 |
| | | 0.9 | 9.4 | 1.1 | 3.2 | 1 | 5.9 | 0.6 | 2.6 | 1.5 | 1.7 | 1.5 | 3.6 | 0.5 | 1 | 0.5 | 1.1 |
| | | 1.5 | 5.4 | 1.1 | 1.6 | 1.1 | 0 | 0.6 | 3.8 | 2 | 1.8 | 1.3 | 4.1 | 1 | 2.3 | 0.8 | 1 |
| | | 2.1 | 3.7 | 0.9 | 0.9 | 1.3 | 2.5 | 0.9 | 4.1 | 1.1 | 1.1 | 0.8 | 1 | 0.8 | 1 | 0.9 | 1 |

TABLE 5-continued

|  |  |  |  |  |  |  |  |  |  |  |  |  |  |  |  |  |
|---|---|---|---|---|---|---|---|---|---|---|---|---|---|---|---|---|
|  |  | 1 | 5.2 | 1.5 | 2.5 | 1.1 | 3.2 | 1.4 | 8.6 | 2.7 | 7.3 | 3 | 5.9 | 1.1 | 0.9 | 0.9 | 0.9 |
|  |  | 2.4 | 3 | 1.2 | 3.9 | 1 | 4.5 | 1.1 | 1.1 | 0.9 | 4.2 | 2 | 4.1 | 1 | 0.9 | 0.9 | 1.3 |
|  |  | 1 | 4 | 0.9 | 1 | 1.1 | 2.5 | 0.9 | 1.6 | 1.3 | 1.5 | 0.9 | 3.9 | 1 | 1.3 | 1.2 | 1.1 |
| FOT (10 bars) | sec | 52.2 | 41.6 | 44.4 | 45.6 | 39.1 | 43.3 | 20.7 | 20.3 |
| AVERAGE FOT (5 bars) | sec | 26 | 21 | 22 | 23 | 20 | 22 | 10 | 10 |
| 0.8 mm pFTP(V0) |  | 0.85 | 0.89 | 0.86 | 0.85 | 0.95 | 0.92 | 1.00 | 1.00 |
| CTI, 250 V | drops | 100 | 86 | 100 | 100 | 93 | 65 | 83 | 54 |

*additives: 0.3% PETS, 0.06% phosphite, 0.3% UV

TABLE 6A

|  |  | Ex-1 | Ex-2 | Ex-3 | Ex-4 | Ex-5 | Ex-6 | Ex-7 | Ex-8 | Ex-9 | Ex-10 |
|---|---|---|---|---|---|---|---|---|---|---|---|
| PC-1 | pbw | 68 | 51 | 34 | 17 |  | 79.5 | 61.5 | 43.5 | 25.5 | 7.5 |
| PC-ST | pbw | 25 | 25 | 25 | 25 | 25 | 12.5 | 12.5 | 12.5 | 12.5 | 12.5 |
| HHPC-1 | pbw |  | 15 | 30 | 45 | 60 |  | 15 | 30 | 45 | 60 |
| TiO$_2$ Type 2 | pbw | 5 | 5 | 5 | 5 | 5 | 6 | 7 | 8 | 9 | 10 |
| BPADP | pbw | 2 | 4 | 6 | 8 | 10 | 2 | 4 | 6 | 8 | 10 |
| TSAN | pbw | 0.3 | 0.3 | 0.3 | 0.3 | 0.3 | 0.3 | 0.3 | 0.3 | 0.3 | 0.3 |
| Additives | pbw | 0.66 | 0.66 | 0.66 | 0.66 | 0.66 | 0.66 | 0.66 | 0.66 | 0.66 | 0.66 |
| Vicat B120 | ° C. | 133.7 | 133.2 | 133.6 | 131.5 | 132.2 | 135.0 | 134.8 | 134.1 | 135.9 | 135.1 |
| BPT indentation | mm | 1.3 | 1.2 | 1.2 | 1.3 | 1.4 | 1.3 | 1.6 | 1.5 | 1.6 | 1.7 |
| BPT, 125° C. | — | Pass | Pass | Pass | Pass | Pass | Pass | Pass | Pass | Pass | Pass |
| ISO INI 23° C. | kJ/m$^2$ | 61.7 | 51.6 | 43.4 | 31.1 | 19.0 | 63.6 | 47.6 | 33.2 | 13.9 | 10.6 |
| ISO INI −30° C. | kJ/m$^2$ | 46.3 | 31.3 | 18.1 | 13.4 | 10.2 | 21.5 | 15.5 | 11.9 | 10.5 | 7.4 |
| ISO Ductility 23° C. | % | 100 | 100 | 100 | 100 | 100 | 100 | 100 | 100 | 0 | 0 |
| ISO Ductility −30° C. | % | 100 | 100 | 0 | 0 | 0 | 0 | 0 | 0 | 0 | 0 |
| MVR | cm$^3$/10 min | 4.9 | 5.6 | 6.1 | 7.7 | 9.4 | 5.8 | 6.4 | 7.6 | 8.1 | 10.8 |

TABLE 6B

|  |  | Ex-11 | Ex-12 | Ex-13 | Ex-14 | Ex-15 | Ex-16 | Ex-17 | Ex-18 | Ex-19 | Ex-20 |
|---|---|---|---|---|---|---|---|---|---|---|---|
| PC-1 | pbw | 68 | 38 | 51 | 64 | 34 | 80.5 | 48.5 | 61.5 | 74.5 | 42.5 |
| PC-ST | pbw | 25 | 25 | 25 | 25 | 25 | 12.5 | 12.5 | 12.5 | 12.5 | 12.5 |
| HHPC-1 | pbw |  | 30 | 15 |  | 30 |  | 30 | 15 |  | 30 |
| TiO$_2$ Type 2 | pbw | 2 | 2 | 4 | 6 | 6 | 2 | 4 | 6 | 8 | 10 |
| BPADP | pbw | 5 | 5 | 5 | 5 | 5 | 5 | 5 | 5 | 5 | 5 |
| TSAN | pbw | 0.3 | 0.3 | 0.3 | 0.3 | 0.3 | 0.3 | 0.3 | 0.3 | 0.3 | 0.3 |
| Additives | pbw | 0.66 | 0.66 | 0.66 | 0.66 | 0.66 | 0.66 | 0.66 | 0.66 | 0.66 | 0.66 |
| Vicat B120 | ° C. | 134.8 | 147.0 | 133.9 | 122.2 | 132.1 | 136.0 | 140.9 | 129.3 | 117.8 | 121.4 |
| BPT indentation | mm | 1.5 | 1.2 | 1.7 | 3.8 | 1.5 | 1.5 | 1.5 | 1.5 | 4.4 | 4.3 |
| BPT, 125° C. | — | Pass | Pass | Pass | Fail | Pass | Pass | Pass | Pass | Fail | Fail |
| ISO INI 23° C. | kJ/m$^2$ | 64.6 | 43.3 | 54.1 | 62.9 | 43.0 | 65.9 | 38.3 | 47.8 | 51.3 | 10.5 |
| ISO INI −30° C. | kJ/m$^2$ | 49.1 | 22.2 | 32.0 | 41.7 | 17.6 | 21.0 | 12.5 | 12.7 | 12.0 | 8.0 |
| ISO Ductility 23° C. | % | 100 | 100 | 100 | 100 | 100 | 100 | 100 | 100 | 100 | 0 |
| ISO Ductility −30° C. | % | 100 | 20 | 100 | 100 | 0 | 0 | 0 | 0 | 0 | 0 |
| MVR | cm$^3$/10 min | 5.2 | 4.1 | 5.8 | 7.5 | 6.1 | 6.1 | 6.3 | 6.9 | 9.4 | 11.2 |

TABLE 6C

|  |  | Ex-21 | Ex-22 | Ex-23 | Ex-24 | Ex-25 | Ex-26 | Ex-27 | Ex-28 | Ex-29 | Ex-30 |
|---|---|---|---|---|---|---|---|---|---|---|---|
| PC-1 | pbw | 34 | 4 | 17 | 30 |  | 46.5 | 16.5 | 28.5 | 42.5 | 12.5 |
| PC-ST | pbw | 25 | 25 | 25 | 25 | 25 | 12.5 | 12.5 | 12.5 | 12.5 | 12.5 |
| HH-PC-1 | pbw | 30 | 60 | 45 | 30 | 60 | 30 | 60 | 46 | 30 | 60 |
| TiO$_2$ Type 2 | pbw | 6 | 6 | 8 | 10 | 10 | 6 | 6 | 8 | 10 | 10 |
| BPADP | pbw | 5 | 5 | 5 | 5 | 5 | 5 | 5 | 5 | 5 | 5 |
| TSAN | pbw | 0.3 | 0.3 | 0.3 | 0.3 | 0.3 | 0.3 | 0.3 | 0.3 | 0.3 | 0.3 |
| Additives | pbw | 0.66 | 0.66 | 0.66 | 0.66 | 0.66 | 0.66 | 0.66 | 0.66 | 0.66 | 0.66 |
| Vicat B120 | ° C. | 133.6 | 147.7 | 133.6 | 121.1 | 134.4 | 134.2 | 148.4 | 134.6 | 122.0 | 134.5 |
| BPT indentation | mm | 1.7 | 0.9 | 1.9 | 5.2 | 1.6 | 1.9 | 0.8 | 1.7 | 5.2 | 1.6 |
| BPT, 125° C. | — | Pass | Pass | Pass | Fail | Pass | Pass | Pass | Pass | Fail | Pass |
| ISO INI 23° C. | kJ/m$^2$ | 44.6 | 24.1 | 32.4 | 38.7 | 21.3 | 32.7 | 13.2 | 12.0 | 11.0 | 9.7 |
| ISO INI −30° C. | kJ/m$^2$ | 18.2 | 13.1 | 13.8 | 14.1 | 11.0 | 11.2 | 9.2 | 9.8 | 9.1 | 7.6 |
| ISO Ductility 23° C. | % | 100 | 100 | 100 | 100 | 100 | 100 | 0 | 0 | 0 | 0 |

TABLE 6C-continued

|  |  | Ex-21 | Ex-22 | Ex-23 | Ex-24 | Ex-25 | Ex-26 | Ex-27 | Ex-28 | Ex-29 | Ex-30 |
|---|---|---|---|---|---|---|---|---|---|---|---|
| ISO Ductility −30° C. | % | 0 | 0 | 0 | 0 | 0 | 0 | 0 | 0 | 0 | 0 |
| MVR | cm³/10 min | 6.5 | 5.4 | 7.2 | 9.9 | 8.9 | 7.1 | 6.2 | 8.2 | 11.1 | 10.4 |

The amounts of the three parameters are based on weight percentage.

$$BPT = +0.81 - 0.058*(\% \text{ HHPC-1}) + 0.46*(\%BPADP) \quad (R^2=0.78) \qquad \text{Eqn 1}$$

$$Vicat = +141 + 0.41*(\% \text{ HHPC-1}) - 3.2*(\%BPADP) \quad (R^2=0.98) \qquad \text{Eqn 2}$$

$$1/INI\text{-}30 = +0.071 - 0.0027*(\%PC\text{-}ST) + 0.00074*(\% \text{ HHPC-1}) + 0.0049*(\%BPADP)(R^2=0.96) \qquad \text{Eqn 3:}$$

The limits for BPT less than (<) 2 mm and Vicat greater than (>) 133° C. essentially overlap. As a result, the minimum % HHPC-1 to be used for a given % BPADP can be calculated as follows:

$$Vicat = +141 + 0.41*(\% \text{ HHPC-1}) - 3.2*(\%BPADP) > 133$$
$$(\%XHT) > (133 - 141 + 3.2*(\%BPADP))/0.41$$
$$(\%XHT) > 7.8*(\%BPADP) - 19.5$$

Based on this minimum quantity of HHPC-1, one can calculate how much PC-ST is needed to give any desired value for INI at −30° C. For example, the amount of PC-ST needed to give INI>25 kJ/m² can be calculated as follows (again, the term "HHPC-1" should not be construed as "HHPC minus one", and the term "PC-ST" should not be construed as "PC minus ST"):

$$1/INI\text{-}30 = +0.071 - 0.0027*(\%PC\text{-}ST) + 0.00074*(\% \text{ HHPC-1}) + 0.0049*(\%BPADP) < 1/25 (\%PC\text{-}ST) > (-1/25 + 0.071 + 0.00074*(\% \text{ HHPC-1}) + 0.0049*(\%BPADP))/0.0027 (\%PC\text{-}ST) > 11.4 + 0.27*(\% \text{ HHPC-1}) + 1.8*(\%BPADP)$$

So for example, if 4 wt % BPADP is used, then about 12 wt % HPPC-1 and about 21.8 wt % PC-ST would need to be used to obtain a blend that has a BPT<2 mm, Vicat>133° C., and INI>25 kJ/m². Generally, the present disclosure contemplates that only two of the three equations need to be met.

Set forth below are some embodiments of the blends disclosed herein.

Embodiment 1

A flame-retardant polycarbonate blend, comprising: a polycarbonate polymer; a polycarbonate-polysiloxane copolymer in an amount such that the blend contains from about 2 wt % to about 6 wt % of siloxane; a copolymer of bisphenol-A and phthalimidine in an amount such that the blend contains from about 1 wt % to about 10 wt % of the phthalimidine; titanium dioxide; and a non-brominated and non-chlorinated phosphorus-containing flame retardant; wherein the polycarbonate blend meets CTI PLC 2 standards and has a flame out time (FOT) of about 40 seconds or less at 1.5 mm thickness.

Embodiment 2

The polycarbonate blend of Embodiment 1, wherein the blend passes the ball pressure test (BPT) at 125° C.

Embodiment 3

The polycarbonate blend as in any of Embodiments 1-2, wherein the blend has a pFTP(V0) value of at least 0.80 at 1.5 mm thickness.

Embodiment 4

The polycarbonate blend as in any of Embodiments 1-3, wherein the blend has 100% ductility at −30° C. when measured under Izod notched impact according to ISO 180.

Embodiment 5

The polycarbonate blend as in any of Embodiments 1-4, wherein the blend has a notched Izod impact strength at −30° C. of at least 25 kJ/m² when measured according to ISO 180.

Embodiment 6

The polycarbonate blend as in any of Embodiments 1-5, wherein the blend has a pFTP(V0) of at least 0.90 and a flame out time (5-bar FOT) of about 30 seconds or less at 0.8 mm thickness.

Embodiment 7

The polycarbonate blend as in any of Embodiments 1-6, wherein the blend has a flame out time (5-bar FOT) of about 40 seconds or less and a pFTP(V0) value of at least 0.80 at 1.5 mm thickness.

Embodiment 8

The polycarbonate blend as in any of Embodiments 1-7, wherein the blend passes the ball pressure test (BPT) at 125° C., and has 100% ductility at −30° C. when measured under Izod notched impact according to ISO 180.

Embodiment 9

The polycarbonate blend as in any of Embodiments 1-8, wherein the blend has a flame out time (FOT) of about 40 seconds or less and a pFTP(V0) value of at least 0.80 at 0.8 mm thickness; passes the ball pressure test (BPT) at 125° C.; and has 100% ductility at −30° C. when measured under Izod notched impact according to ISO 180.

Embodiment 10

The polycarbonate blend as in any of Embodiments 1-9, wherein the blend passes the ball pressure test (BPT) at 125° C.; has 100% ductility at −30° C. when measured according to ISO 180; and has a notched Izod impact strength at −30° C. of at least 25 kJ/m² when measured according to ISO 180.

Embodiment 11

The polycarbonate blend as in any of Embodiments 1-10, wherein the blend has a flame out time (FOT) of about 30 seconds or less and a pFTP(V0) value of at least 0.90 at 0.8 mm thickness; and has a notched Izod impact strength at −30° C. of at least 20 kJ/m² when measured according to ISO 180.

Embodiment 12

The polycarbonate blend as in any of Embodiments 1-11, wherein the polycarbonate-polysiloxane copolymer contains from about 6 wt % to about 20 wt % of siloxane.

Embodiment 13

The polycarbonate blend as in any of Embodiments 1-12, wherein the copolymer of bisphenol-A and phthalimidine contains from about 20 mole % to about 40 mole % of the phthalimidine.

Embodiment 14

The polycarbonate blend as in any of Embodiments 1-13, wherein the blend contains the non-brominated and non-chlorinated phosphorus-containing flame retardant in an amount such that the blend contains from about 0.15 wt % to about 1.0 wt % of phosphorus.

Embodiment 15

The polycarbonate blend as in any of Embodiments 1-14, wherein the blend contains from about 2 wt % to about 10 wt % of the non-brominated and non-chlorinated phosphorus-containing flame retardant.

Embodiment 16

The polycarbonate blend as in any of Embodiments 1-15, wherein the blend contains: from about 30 wt % to about 80 wt % of the polycarbonate polymer; from about 2 wt % to about 20 wt % of the titanium dioxide; and from about 2 wt % to about 10 wt % of the non-brominated and non-chlorinated phosphorus-containing flame retardant.

Embodiment 17

The polycarbonate blend as in any of Embodiments 1-16, wherein the blend contains from about 0.1 wt % to about 1 wt % of carbon black.

Embodiment 18

The polycarbonate blend as in any of Embodiments 1-17, wherein the blend can achieve UL94 V0 performance at a thickness of 1.5 mm.

Embodiment 19

The polycarbonate blend as in any of Embodiments 1-18, wherein the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected to obtain a designed combination of (i) an notched Izod impact strength in kJ/m² (INI) with (ii) either a ball pressure test indentation in millimeters (BPT) or a Vicat B120 temperature in ° C. (Vicat), according to the following three equations:

$$BPT = +0.81 - 0.058*(\% \ HHPC\text{-}1) + 0.46*(\%BPADP) \quad \text{Eqn 1}$$

$$Vicat = +141 + 0.41*(\% \ HHPC\text{-}1) - 3.2*(\%BPADP) \quad \text{Eqn 2}$$

$$1/INI - 30 = +0.071 - 0.0027*(\%PC\text{-}ST) + 0.00074*(\% \ HHPC\text{-}1) + 0.0049*(\%BPADP). \quad \text{Eqn 3}$$

Embodiment 20

A method for preparing a blend having a desired combination of a ball pressure test indentation in millimeters (BPT), a Vicat B120 temperature in ° C. (Vicat), and an notched Izod impact strength in kJ/m² (INI), comprising: blending a polycarbonate polymer, a polycarbonate-polysiloxane copolymer, a copolymer of bisphenol-A and phthalimidine, titanium dioxide (TiO₂), and a non-brominated and non-chlorinated phosphorus-containing flame retardant to obtain the blend; wherein the blend contains from about 2 wt % to about 6 wt % of siloxane, and from about 1 wt % to about 10 wt % of the phthalimidine; wherein the polycarbonate blend meets CTI PLC 2 standards and has a flame out time (FOT) of about 40 seconds or less at 1.5 mm thickness; and wherein the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected according to the following three equations to obtain the desired combination of (i) an notched Izod impact strength in kJ/m² (INI) with (ii) either the ball pressure test indentation in millimeters (BPT) or a Vicat B120 temperature in ° C. (Vicat):

$$BPT = +0.81 - 0.058*(\% \ HHPC\text{-}1) + 0.46*(\%BPADP) \quad \text{Eqn 1}$$

$$Vicat = +141 + 0.41*(\% \ HHPC\text{-}1) - 3.2*(\%BPADP) \quad \text{Eqn 2}$$

$$1/INI - 30 = +0.071 - 0.0027*(\%PC\text{-}ST) + 0.00074*(\% \ HHPC\text{-}1) + 0.0049*(\%BPADP). \quad \text{Eqn 3}$$

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A thin-wall article comprising a flame-retardant polycarbonate blend, the flame-retardant polycarbonate blend comprising:
   a polycarbonate polymer;
   a polycarbonate-polysiloxane copolymer in an amount such that the blend contains from about 2 wt % to about 6 wt % of siloxane;
   a copolymer of bisphenol-A and phthalimidine in an amount such that the blend contains from about 1 wt % to about 10 wt % of the phthalimidine;
   titanium dioxide (TiO₂); and
   a non-brominated and non-chlorinated phosphorus-containing flame retardant;
   wherein the polycarbonate blend meets CTI PLC 2 standards and has a flame out time (FOT) of about 40 seconds or less at 1.5 mm thickness; and
   the thin-wall article has a wall thickness of 1.5 millimeters or less;
   wherein the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected to obtain a designed combination of (i) an notched Izod impact strength in kJ/m² (INI) with (ii) either a ball pressure test indentation in millimeters (BPT) or a Vicat B120 temperature in ° C. (Vicat), according to the following three equations:

$$BPT = +0.81 - 0.058*(\% \text{ HHPC-1}) + 0.46*(\%BPADP) \quad \text{Eqn 1:}$$

$$Vicat = +141 + 0.41*(\% \text{ HHPC-1}) - 3.2*(\%BPADP) \quad \text{Eqn 2:}$$

$$1/INI\text{-}30 = +0.071 - 0.0027*(\%PC\text{-}ST) + 0.00074*(\% \text{HHPC-1}) + 0.0049*(\%BPADP). \quad \text{Eqn 3:}$$

2. The thin-wall article of claim 1, wherein the blend passes the ball pressure test (BPT) at 125° C.

3. The thin-wall article of claim 1, wherein the blend has a pFTP(V0) value of at least 0.80 at 1.5 mm thickness.

4. The thin-wall article of claim 1, wherein the blend has 100% ductility at −30° C. when measured under Izod notched impact according to ISO 180.

5. The thin-wall article of claim 1, wherein the polycarbonate blend has notched Izod impact strength at −30° C. of at least 25 kJ/m² when measured according to ISO 180.

6. The thin-wall article of claim 1, wherein the polycarbonate blend has a pFTP(V0) of at least 0.90 and a flame out time (5-bar FOT) of about 30 seconds or less at 0.8 mm thickness.

7. The thin-wall article of claim 1, wherein the polycarbonate blend has a flame out time (5-bar FOT) of about 40 seconds or less and a pFTP(V0) value of at least 0.80 at 1.5 mm thickness.

8. The thin-wall article of claim 1, wherein the polycarbonate blend passes the ball pressure test (BPT) at 125° C., and has 100% ductility at −30° C. when measured under Izod notched impact according to ISO 180.

9. The thin-wall article of claim 1, wherein the polycarbonate blend has a flame out time (FOT) of about 40 seconds or less and a pFTP(V0) value of at least 0.80 at 0.8 mm thickness; passes the ball pressure test (BPT) at 125° C.; and has 100% ductility at −30° C. when measured under Izod notched impact according to ISO 180.

10. The thin-wall article of claim 1, wherein the blend passes the ball pressure test (BPT) at 125° C.; has 100% ductility at −30° C. when measured according to ISO 180; and has a notched Izod impact strength at −30° C. of at least 20 kJ/m² when measured according to ISO 180.

11. The thin-wall article of claim 1, wherein the blend has a flame out time (FOT) of about 30 seconds or less and a pFTP(V0) value of at least 0.90 at 0.8 mm thickness; and has a notched Izod impact strength at −30° C. of at least 20 kJ/m² when measured according to ISO 180.

12. The thin-wall article of claim 1, wherein the polycarbonate-polysiloxane copolymer contains from about 6 wt % to about 20 wt % of siloxane.

13. The thin-wall article of claim 1, wherein the copolymer of bisphenol-A and phthalimidine contains from about 20 mole % to about 40 mole % of the phthalimidine.

14. The thin-wall article of claim 1, wherein the blend contains the non-brominated and non-chlorinated phosphorus-containing flame retardant in an amount such that the blend contains from about 0.15 wt % to about 1.0 wt % of phosphorus.

15. The thin-wall article of claim 1, wherein the blend contains from about 2 wt % to about 10 wt % of the non-brominated and non-chlorinated phosphorus-containing flame retardant.

16. The thin-wall article of claim 1, wherein the blend contains:
   from about 30 wt % to about 80 wt % of the polycarbonate polymer;
   from about 2 wt % to about 20 wt % of the titanium dioxide (TiO₂); and
   from about 2 wt % to about 10 wt % of the non-brominated and non-chlorinated phosphorus-containing flame retardant.

17. The thin-wall article of claim 1, wherein the blend contains from about 0.1 wt % to about 1 wt % of carbon black.

18. The thin-wall article of claim 1, wherein the blend can achieve UL94 V0 performance at a thickness of 1.5 mm.

19. A method for preparing a blend having a desired combination of a ball pressure test indentation in millimeters (BPT), a Vicat B120 temperature in ° C. (Vicat), and a notched Izod impact strength in kJ/m² (INI), comprising:
   blending a polycarbonate polymer, a polycarbonate-polysiloxane copolymer, a copolymer of bisphenol-A and phthalimidine, titanium dioxide (TiO₂), and a non-brominated and non-chlorinated phosphorus-containing flame retardant to obtain the blend;
   wherein the blend contains from about 2 wt % to about 6 wt % of siloxane, and from about 1 wt % to about 10 wt % of the phthalimidine;
   wherein the polycarbonate blend meets CTI PLC 2 standards and has a flame out time (FOT) of about 40 seconds or less at 1.5 mm thickness; and
   wherein the weight percentage of the polycarbonate-polysiloxane copolymer (% PC-ST), the weight percentage of the copolymer of bisphenol-A and phthalimidine (% HPPC-1), and the weight percentage of the flame retardant (% BPADP) are selected according to the following three equations to obtain the desired combination of (i) an notched Izod impact strength in kJ/m² (INI) with (ii) either the ball pressure test indentation in millimeters (BPT) or a Vicat B120 temperature in ° C. (Vicat):

$$BPT = +0.81 - 0.058*(\% \text{ HHPC-1}) + 0.46*(\%BPADP) \quad \text{Eqn 1:}$$

$$Vicat = +141 + 0.41*(\% \text{ HHPC-1}) - 3.2*(\%BPADP) \quad \text{Eqn 2:}$$

$$1/INI\text{-}30 = +0.071 - 0.0027*(\%PC\text{-}ST) + 0.00074*(\% \text{HHPC-1}) + 0.0049*(\%BPADP). \quad \text{Eqn 3:}$$

* * * * *